Jan. 9, 1934.    T. W. PROSSER ET AL    1,942,729
HOSIERY DRYING APPARATUS
Filed July 23, 1931    5 Sheets-Sheet 1
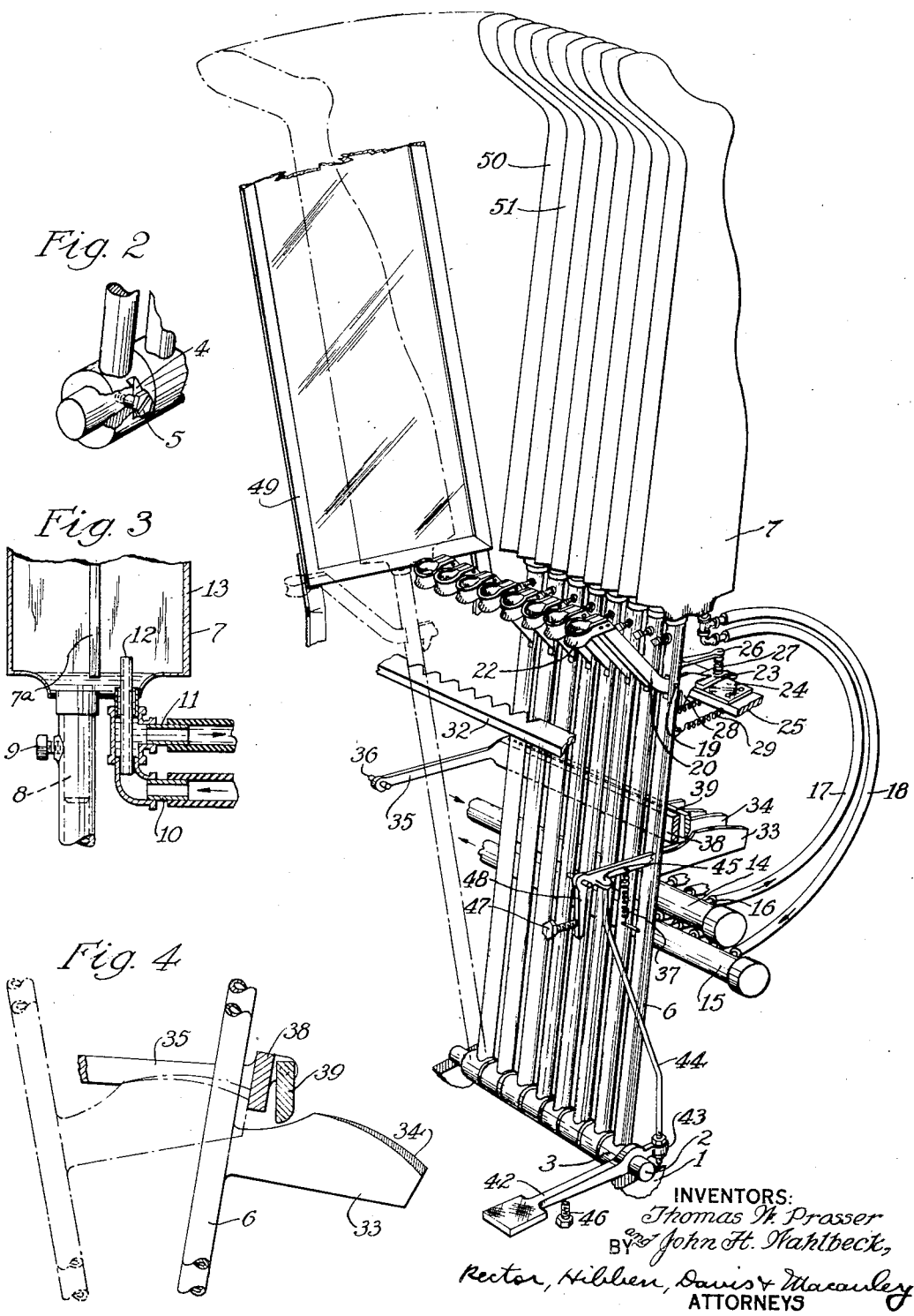

Jan. 9, 1934.  T. W. PROSSER ET AL  1,942,729
HOSIERY DRYING APPARATUS
Filed July 23, 1931  5 Sheets-Sheet 2
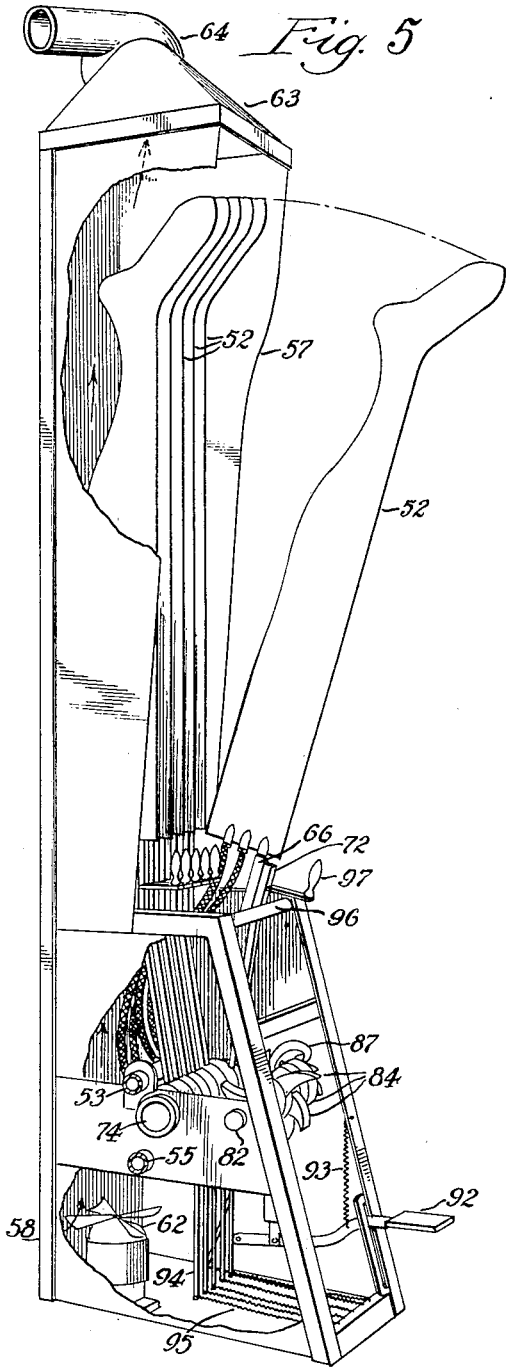
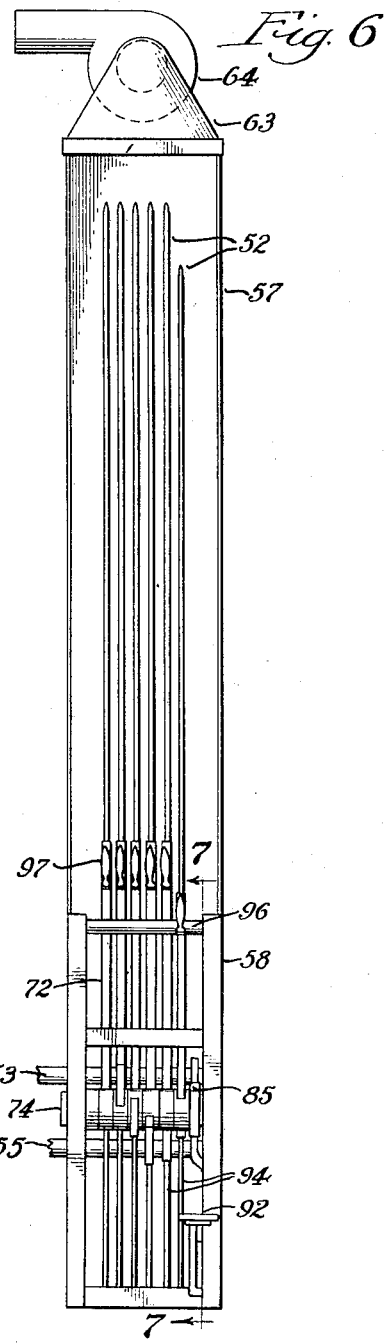
Inventors:
Thomas W. Prosser
and John H. Wahlbeck,
By Rector, Hibben, Davis & Macauley
Attys.

Jan. 9, 1934.  T. W. PROSSER ET AL  1,942,729
HOSIERY DRYING APPARATUS
Filed July 23, 1931   5 Sheets-Sheet 3
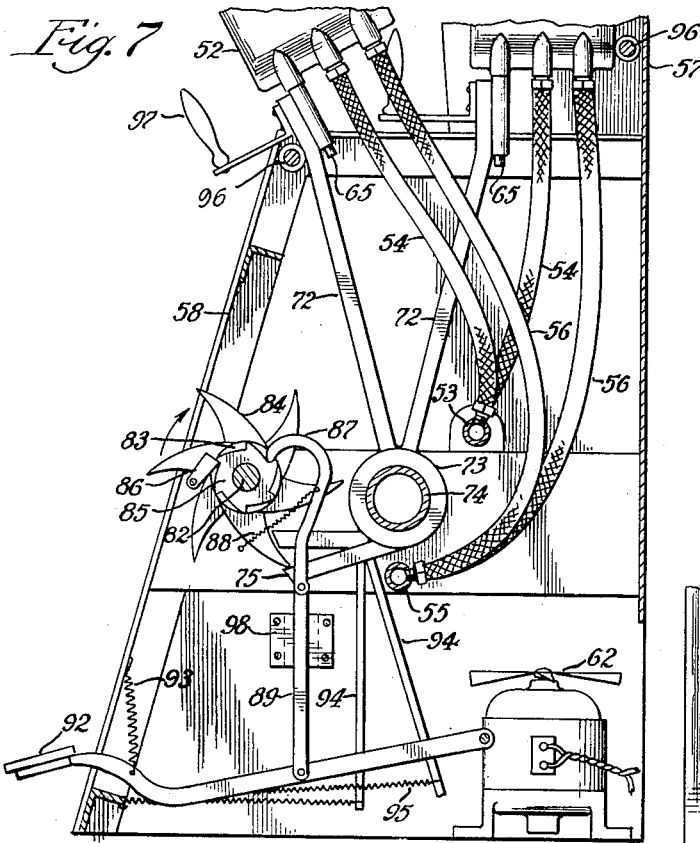
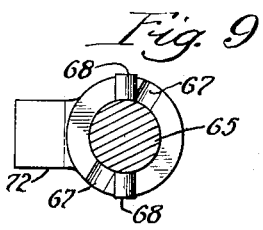
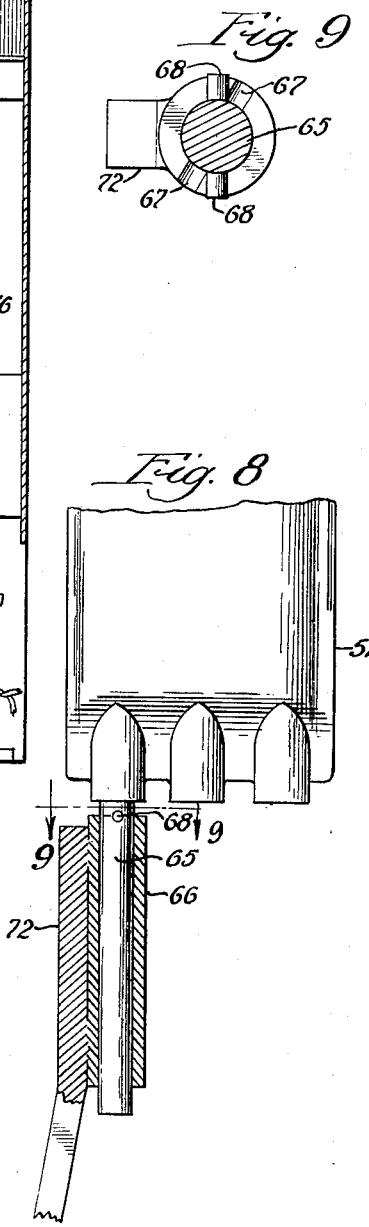
Inventors:
Thomas W. Prosser
and John H. Wahlbeck,
By Rector, Hibben, Davis & Macauley
Attys.

Inventors:
Thomas W. Prosser
and John H. Stahlbeck,

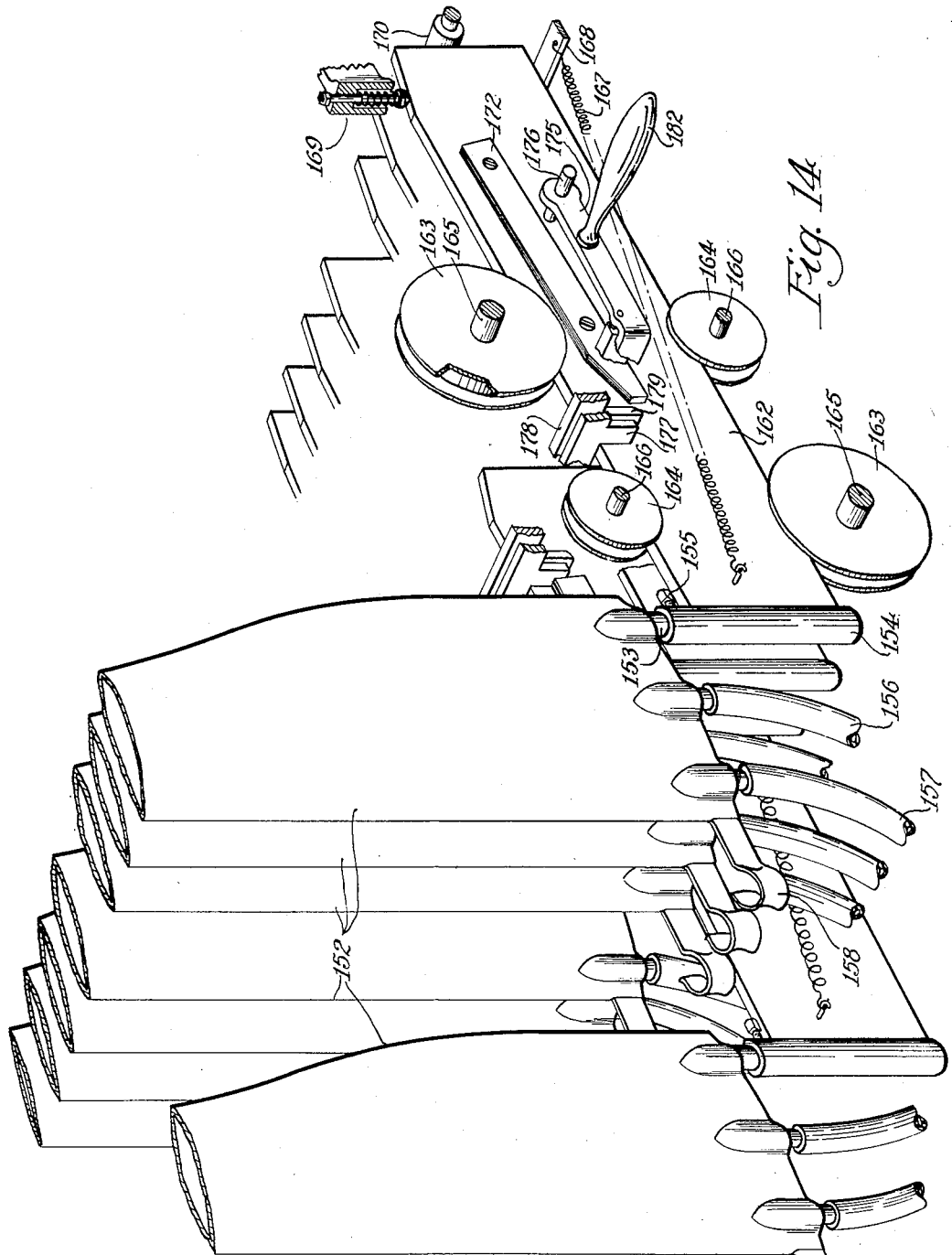

Patented Jan. 9, 1934

1,942,729

UNITED STATES PATENT OFFICE 1,942,729

HOSIERY DRYING APPARATUS

Thomas W. Prosser and John H. Wahlbeck, Kankakee, Ill., assignors to Paramount Textile Machinery Co., Chicago, Ill., a corporation of Illinois Application July 23, 1931. Serial No. 552,658

63 Claims. (Cl. 223—17)

This invention relates to improvements in hosiery drying apparatus and is primarily concerned with providing a novel disposition of internally heated associated forms for the purpose of materially improving the overall efficiency of the unit through utilizing a greater proportion of the available drying heat for useful work by decreasing heat losses and increasing the heat transmission rate of the structure.

It is now the practice to mount internally heated forms upon long tables which usually accommodate twenty-four forms arranged in two rows of twelve forms on each side of the table. The forms are so positioned that their sides are in alinement, longitudinally of the table, or at an angle to the conduit which supplies a heating medium to the forms, and the two rows of forms are separated by a centrally disposed support. There is accordingly no opportunity for cooperative heat action between adjacent forms, whether in the same or different rows, and much heat is therefore lost. Moreover, these installations require heating conduits extending the full length of the tables which results in considerable loss of heat by radiation from the surface of the conduits. The heat lost by radiation from the forms and the conduits is diffused throughout the drying room creating a condition of high temperature and discomfort to the operator.

The tables now in use, arranged as above set forth, occupy considerable floor space and require that the operator walk the full length of the tables many times in the course of a day, with fatiguing results. Moreover, the position of the forms is not entirely convenient for boarding and stripping because of the trough and sliding shelf which extends along each side of the table between the forms and the operator. In practice, the operator, when walking along the table, usually boards a number of stockings, then strips a number, with the result that some of the forms are always out of operation.

The principal object of our invention is to provide a hosiery drying apparatus in which a plurality of drying forms is mounted with their adjacent sides presented in close facing relation, whereby a cooperative heat action is established between the forms with a resultant economy of heat and expediting of the drying operation.

It is another object of our invention to provide hosiery drying apparatus in which the relative disposition of the forms sets up a chimney-like action between adjacent pairs of forms, thereby effectually removing the evaporated moisture and materially improving the rate of heat transmission from the interior of the form owing to the movement of the vapor laden air over the stocking which prevents the formation of a relatively quiescent, closely adhering, heat insulating film on the stocking.

Another object of our invention is to provide apparatus of the character set forth in which the drying forms are movably mounted and in which the forms may be successively or selectively moved from drying position into position for boarding and stripping.

Another object of our invention is to provide the above apparatus with means, manually or mechanically operated, for ejecting the forms successively or selectively out of drying position for boarding or stripping, and means, manually or mechanically operated, for restoring the forms to drying position.

A further object of the invention is to provide a hosiery drying apparatus in which the individual drying forms constituting the unit are so arranged that, in the normal operation of the apparatus, the forms will always be in use, with manifest advantages from the standpoint of output.

A further object is to provide a drying structure comprising a plurality of hosiery forms which are selectively movable to stripping position and thereafter automatically retractable to drying position by the movement of another form to stripping position.

A further object is to provide a hosiery drying structure comprising a plurality of hosiery drying forms which is conditioned to move the forms in pairs to stripping position for simultaneous withdrawal of the stockings, to return one form of the pair to drying position while the other form is being boarded with a stocking, to return the boarded form to drying position and move the other form of the pair to boarding position to receive a stocking, to return the form last boarded to drying position, and to move another pair of forms to stripping position.

A further object is to provide a hoisery drying structure comprising a plurality of hosiery drying forms which is conditioned to move a group of forms to stripping position for simultaneous withdrawal of the stockings, to return the group less one form to drying position, to board a stocking on the last noted form, to return the boarded form to drying position, to board singly the remainder of the group while in boarding position, to return the last boarded form of the group to drying position, and to move another group of forms to stripping position.

A further object of our invention is to provide hosiery drying apparatus of simple, compact construction, occupying an amount of floor space which necessitates a minimum of effort on the part of the operator and requiring relatively short lengths of heating conduit, whereby heat lost by radiation is reduced to a minimum, and a saving is effected both in the cost of installation and maintenance.

Another object of our invention is to provide apparatus of the character set forth in which the internally heated forms are enclosed in a casing having means for exhausting the heated air therefrom, with consequent improvement in boarding room conditions.

The provision of arranging the forms in juxtaposition with their sides in closely spaced, facing relation results in certain heat economies and a more efficient apparatus than is possible where the forms occupy relatively isolated positions. In the first place, and considering any intermediate form in the group, it will be apparent that the forms may be so spaced that the heat emitted by the adjacent forms on opposite sides of the form in question will maintain the temperature in the intervening spaces appreciably above that which would obtain at an equal distance from an isolated form. Accordingly, the heat lost to the surrounding atmosphere will be materially less than for an isolated form, since the difference in temperature between the form in the group and its surrounding atmosphere is less than for the isolated form. In other words, the heat condition established by the adjacent forms functions substantially as a brake on the cooling rate of the form therebetween. Moreover, the percentage of form area directly exposed to the free cooling action of the surrounding air is considerably less than for an isolated form.

As a further advantage, the closely spaced upright disposition of the forms and the heated condition obtaining between adjacent pairs of forms provides for a chimney-like action between the latter, since the space temperatures are considerably higher than the surrounding atmosphere. There will thus be created upwardly moving columns of heated air carrying evaporated moisture between the forms, the moisture carrying capacity of the air being much greater than for an isolated form because of the higher temperature, and the rate of heat transmission outwardly from the form being higher because of the velocity of the moving air column established by natural draft. As is well known, the rate of heat transmission across a plate between hot and cold fluids is dependent upon the velocity of the fluids along the plate. In the present instance, the hot fluid within the form, steam for example, is moving, while the draft provides for the upward sweeping action of the relatively cold fluid, externally of the form, thus partially, at least, destroying the heat insulating film that would be otherwise formed on the stocking. It is recognized that the foregoing advantages do not hold strictly for the outer faces of the end forms.

Although we have illustrated the forms as occupying a more or less upright position during the drying operation, it will be understood that such positions are considered to be non-restrictive, for the heat relations established are susceptible of attainment in other form positions.

Besides spacing the forms to obtain a temperature therebetween above that around an isolated form, the forms may be so spaced as to obtain correspondingly different temperature relations with reference to an isolated form, either equal to or less than the temperature surrounding the latter. In this event, the draft conditions between adjacent pairs of forms will still be operative.

The advantages of our invention are manifold and important. Chief among them may be mentioned saving of heat, expediting the drying operation, and improvement of boarding room conditions. The apparatus is built as a small unit, when compared with present tables, and is, therefore, easily and cheaply shipped, installed, and maintained. In the use of our apparatus, the forms are presented to the operator in a position convenient for boarding and stripping, with a resultant increase in production per form and per operator, since the latter's movements are reduced to a minimum. By eliminating the trough generally found in prior types of equipment, the operator is enabled to work closer to the form and this condition, coupled with the fact that the construction of the present apparatus permits the forms to be closer to the floor, and inclined thereto, renders boarding, even by a person of short stature, considerably easier.

Other objects and advantages will in part become apparent and in part more specifically brought out as the description proceeds.

In order that our invention may be made clear to those skilled in the art, we have appended hereto drawings showing a practical embodiment of the invention and several modifications of the means or mechanism for actuating the drying forms from drying position into position for boarding or stripping. The drawings are merely illustrative, and it is to be understood that we are not limited to the details of construction therein disclosed. The invention may be embodied in other forms without sacrificing any of its advantages or departing from the scope thereof as defined in the appended claims.

In the drawings:

Figure 1 is a perspective view of a preferred embodiment of our hosiery drying apparatus; inconsequential parts being broken away or omitted for clarity;

Figure 2 is a detail of the collar retaining means for the form supports;

Figure 3 is a detail in partial section of the lower end of the forms of Figure 1;

Figure 4 is a partial view of the two different form cams, showing the two extreme positions thereof;

Figure 5 is a perspective view of a modification of our invention, parts being broken away to show details;

Figure 6 is a front view of the apparatus illustrated in Figure 5.

Figure 7 is a fragmentary view on the line 7—7 in Figure 6, showing particularly the form-actuating mechanism;

Figure 8 is a fragmentary view of the lower part of a hosiery drying form of Figure 5 showing the swivel mounting;

Figure 9 is a sectional view taken on line 9—9 in Figure 8;

Figure 12 is a view similar to Figures 10 and 11 showing still another modified form of form-actuating mechanism;

Figure 12:
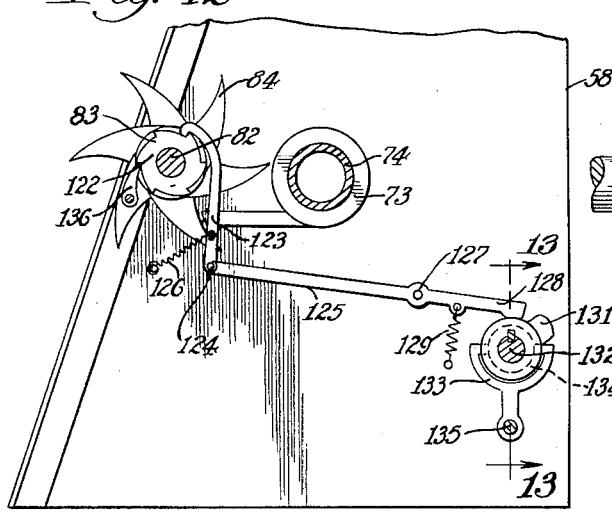
Figure 13:
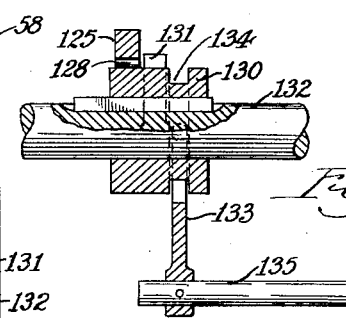

Figure 13 is a sectional view taken on line 13—13 in Figure 12; and

Figure 14 is a perspective view of a further modification of the invention, certain parts being omitted and others broken away for clearness.

For convenience of description and claiming, the rearward position of the forms is hereinafter denoted as the drying position, while the forward position is referred to as the boarding or stripping position. The latter terms are employed to designate the same position of the form per se, the context dictating the choice as between them. It will be further understood, however, that since the forms are always heated, they are continuously capable of drying stockings placed thereon, regardless of whether the forms are occupying the "drying position" noted above, or some other position.

Referring to Figure 1, the numeral 1 indicates a framework of any suitable construction. Fixed in the lower part of said framework, which preferably rests on the floor, is the horizontally disposed rod or shaft 2 and rotatably mounted thereon are the collars 3, in number equal to the number of hosiery drying forms desired, which may be any quantity depending upon the texture of the goods being finished and the drying temperature utilized therefor. In the structure depicted in Figure 1, eight forms are shown and in that of Figure 5, six are shown, it being understood that the actual number used is no part of the present invention, the essential features and characteristics thereof being applicable to an apparatus of any capacity.

To retain the collars 3 and their associated parts in proper relation, each collar is provided with a slot 4 which coacts with a shouldered screw 5 threaded into the shaft 2, as clearly shown in Figure 2. Affixed to each collar 3 in any common manner as, for example, by welding, is a form supporting arm 6 which, in the device illustrated, is composed of tubing or pipe for lightness and rigidity, although the shape thereof is no part of the invention. Disposed at the upper extremity of each arm 6 is a drying form 7.

The forms are arranged with the sides thereof in relatively close, facing relation so that they are adapted for effective heat cooperation with respect to each other, and they may be of any preferred and well-known construction, that is to say, they may be cast of aluminum or made of sheet metal. As described hereinafter, the characteristic operation of the apparatus involves a movement of two adjacent forms to stripping position and the simultaneous withdrawal of the two stockings by the operator. In carrying out this step, the operator habitually spans the hands across the edges of the forms, one hand grasping the stockings in the region of the heels and the other at some convenient portion of the legs, with the index finger of each hand extending between the forms. If this manner of stripping is employed, the minimum spacing of the forms is determined by the average thickness of an operator's index finger so that the least width of the space, considering the curved surface of the forms, would be of the order of 5/8 of an inch. It will be understood, however, that this measurement may be substantially varied either way, while still maintaining the cooperative heat relationship between the forms, although a smaller measurement might require a change in the operator's method of stripping. In the present instance, the forms are hollow for the purpose of receiving a heating medium such as hot water, steam, electricity, or any combination thereof which may be found desirable, and each is provided with the customary septum 7ª which extends centrally of the interior of the form throughout the major portion of its length and serves to direct the heating medium upwardly and downwardly of the form on opposite sides of the septum.

In the lower end of each form 7, a stud 8, (Figure 3) is provided which is adapted to fit snugly within the hollow arm 6 and is retained in position by the set screw 9. By loosening the screw and disconnecting the hose (presently described), the form may be readily removed and one of different shape interchanged therewith.

The form illustrated is adapted to be heated by steam, and for this purpose an inlet nozzle 10 and a return nozzle 11 are provided. The former is screwed into a standard pipe elbow into which is brazed the tube 12 for supplying the steam to the chamber 13 of the form. The condensate drains through a nipple and T and thence through the nozzle 11, sufficient space being provided between the tube 12, and the nipple and T for passage thereof.

Disposed below the forms 7 are the supply and return headers 14 and 15, each provided along its length with nozzles 16. Extending between the nozzles 16 and the nozzles 10 and 11, are flexible conduits or lengths of hose 17 and 18, through which the heating medium and condensate may pass, regardless of the position of the form.

Pivotally connected, as at 19, near the upper end of each arm 6, is a lever 20, each provided with a loop or ring 22 as a finger pull for moving the forms from drying to boarding and stripping position. The rear extremity of each lever 20 is provided with a flat shoe 23 which cooperates with a pad 24 of frictional material, preferably brake lining or the like, mounted on a supporting bar 25 which is carried by the framework 1 in any convenient manner. A projection 26 extends rearwardly from each arm 6 above the pivot 19, and between each shoe 23 and said projection is interposed a compression spring 27 serving to apply the proper frictional engagement between the shoe 23 and pad 24, the purpose of which will be hereinafter explained. To prevent rebound of the form 7 and its associated members when the form is released to drying position, the extreme end of the shoe 23 may be bent downwardly to latch over the pad 24. In addition, a small lug 28 is provided on each lever 20 which contacts with the arm 6 and prevents excessive rotation of said lever due to the spring 27 when the form is in boarding position. Extending between each arm 6 and the bar 25 are the individual springs 29 serving to return the forms to drying position.

In the front of the apparatus is mounted a bumper bar 32 composed of, or covered with, resilient material, and provided with a series of equi-spaced notches, each adapted to receive an arm 6 when a form is shifted to its forward position. The bar 32 serves to absorb the shock of stoppage of the form in its forward position, as well as a steadying agent during the boarding and stripping operations.

Referring to Figures 1 and 4, it will be seen that each arm 6 is provided with either a cam member 33 or a cam member 34, so that adjacent arms carry different cam members, the cam 33 having an upper outer corner which is lower than the corresponding corner of its adjacent cam 34 for a purpose presently explained. Adapted to cooperate with the cams 33 and 34 is a bail blade 38 carried by a bail 35, the latter being pivoted in any convenient manner to the framework at 36 and urged in a downward direction by a spring 37 attached thereto and to the framework. Parallel to and pivoted to rearward projections on the blade 38 is an apron 39 adapted to swing freely through a small angle, and having its lower edge disposed lower than that of the blade 38. Pivoted on the shaft 2 is a pedal 42 having a rearward extension 43, to which is connected the lower end of a push rod 44 whose upper end abuts against the under side of an arm 45 provided on the bail 35. The downward travel of the pedal 42 is limited by an adjustable stop 46 and adjustment of the lowermost position of the bail 35 is effected by means of a screw 47 which coacts with a downwardly extending arm 48 on said bail. Accordingly, actuation of the pedal 42 provides for only a limited movement of the bail 35 and this feature of operation is availed of to secure a selective release of one form to drying position subsequent to a movement of two forms to stripping position, as will be presently explained.

As a further feature of this invention, it has been found desirable to furnish a mirror 49, attached to the framework in any manner, whereby the operator, who stands to the right of each form in boarding position, may view the opposite side of the stocking to ascertain whether it is straight and smooth upon the form and pulled down to the proper length markers, if such are provided on the forms.

The operation of the preferred embodiment of our drying structure will now be explained: Assuming that the forms, with hosiery mounted thereon, are occupying their retracted or drying positions (as shown in Figure 1), the operator, for example, by means of the finger pulls 22 moves forward the adjacent forms 50 and 51 which it will be considered have completed the drying operation and which are provided with the high and low cams 34 and 33, respectively. Due to the upward slope of the forward ends of the levers 20, part of the forward pull is transformed into an upward movement of the shoes 23, thereby instantly releasing them from the friction pad 24 without drag and permitting the two forms to be swung forward about the shaft 2 and against the tension of the springs 29 until arrested by the bumper 32. During this movement, the cam members 33 and 34 coact with the apron 39 to lift the bail 35 and its blade 38 upward (Figure 4), whereupon the apron 39 slides along the curved top edge of the cam 34. Just before the forms reach their foremost position, the apron clears the cams and the blade 38 drops to the upper edge of the cam 34 and thereafter behind the rear extremities of the cams 33 and 34, thus locking the arms 6 and forms 7 in their foremost position (as shown by dotted lines in Figure 4).

Thereupon the operator simultaneously strips the two finished stockings and lays them on a table. The stripped form 51 is then released, for retraction to the full line position shown in Fig. 1 under the pull of the spring 29, by moving the pedal 42 downwardly. The actuation of the pedal releases only the form 51 to normal drying position, since, due to the screw 46, the push rod 44 can only be elevated sufficiently to move the blade 38 clear of the lower-cut cam 33, leaving the cam 34 and its associated form 50 securely locked in the forward position. Upon the shoe 23 engaging the brake pad 24 the shock incident to the return movement of the form 51 is absorbed, the spring 27 applying appropriate pressure to increase the friction.

Immediately following the retraction of the form 51, the operator boards a stocking on the form 50 which is then automatically returned to drying position by pulling the form 51 to boarding position to receive a stocking, the movement of the latter form raising the blade 38 in the manner described above to thus free the form 50 for return. It will be understood that retraction of the form 50 may be effected by pulling any one of the forms then in drying position, the form 51 having been suggested as being in accord with the ordinary sequence of operating the forms.

The steps set forth above are then repeated for successive pairs of forms, preferably, viz: the operator strips two stockings from a pair of forms in the forward position; releases one form; boards a stocking on the forward form; automatically releases the boarded form by pulling forward the other form just stripped; boards a stocking on the latter form; and releases the latter boarded form by pulling forward the next pair of forms for stripping, or any other form in the group.

The purpose of the apron 39 is to free the cam 34 from engagement with the blade 38 well in advance of any form or the next two forms reaching its or their foremost position, thereby preventing hindrance and delay in the stripping operation which might otherwise be caused by the late release of a form in stripping position. In accomplishing this result, the cam 33 or the cam 34, depending upon whether one or a pair of forms is being withdrawn from drying position actuates the apron 39 to lift the blade 38 and release the then forward cam 34. In its rearward movement, the latter cam 34 maintains the blade 38 in raised position until the pair of forms in question are well forward; the blade eventually dropping into position to lock the newly operated cams 33 and 34. During the rearward movement of the cam 34, the apron 39 is swung rearwardly thereby and held inactive until the end of the movement when it is free to drop to its normal position illustrated in Figure 4, clearance being provided in the upper edges of the cams as shown.

Owing to the small number of forms and their compact grouping, the operator is enabled to remain in one position and, by means of the mechanism described, successively bring adjacent forms into proper position for boarding and stripping. This arrangement represents a material improvement over present practice in which the operator is required to walk the full length of a table upon which as many as twelve forms are mounted in a row.

In Figures 5 to 9, inclusive, is depicted a modified embodiment of our apparatus. Essentially, the construction and operation are similar to the preferred type described above, except that the modified embodiment is only arranged to successively present forms for stripping and boarding by pedal operation. A further difference is the provision of a casing partially surrounding the forms to retain the radiated heat and thus improve the drying efficiency of the unit for any given temperature, in conjunction with a fan for providing a forced draft through the casing to more effectively remove the evaporated moisture.

The forms 52 are arranged substantially as in the apparatus of Figure 1 except that they occupy a more upright drying position, although this difference is immaterial so far as the drying operation is concerned. Where the heating medium employed is either steam or hot water, it will be supplied through a suitable conduit 53 and each of the forms will be connected thereto by a flexible hose 54. The structure is also provided with a return conduit 55 and each of the forms is provided with a flexible hose 56 connected to said conduit whereby condensate may be conducted to the return pipe. Surrounding the forms on three sides is a casing 57 supported on a suitable base or frame 58 which carries the operating mechanism presently described.

Further to promote drying, we have provided a suitable fan 62, located in the base of the apparatus which establishes a forced draft upwardly through the casing and between the forms, thus increasing the rate of heat transmission from the interior of the forms with manifest improvement in the drying rate, and also serving to remove the evaporated moisture. To assist the vertical movement of the air through the casing, the top thereof is provided with a hood 63 in which is mounted an exhaust fan 64 which provides an induced draft. By the foregoing arrangement, the heat necessary to dry the hosiery is confined to a large extent within the casing and is withdrawn therefrom and allowed to escape to the atmosphere, preferably outside of the boarding room. Thus, the boarding room conditions are materially improved.

Each form (see Fig. 8) is provided with a stud 65 which extends below the bottom of the form and is rotatably mounted in a tubular housing 66. The purpose of this construction is to provide a swivel mounting for each form, so that the operator may rotate the forms for inspection of both sides of the stocking. In order to maintain the forms in proper position, the housing 66 is provided at its upper edge with notches or recesses 67 and the stud 65 is provided with pins 68 adapted to enter said notches or recesses, (see Fig. 9). The weight of the forms may be sufficient to urge the pins 68 into the recesses 67, but if a more positive action is desired, a suitable spring may be interposed between the housing 66 and the stud 65.

One end of an arm 72 is secured to each of the housings 66 in any convenient manner, as for example, by welding and the opposite end terminates in a collar 73 which surrounds a shaft 74 supported in the frame 58. Each of the collars 73 is provided with a tripping lever 75 which is engaged by a cam, presently described, for the purpose of swinging the drying forms about the shaft 74.

The cam structure for actuating the forms comprises a cam shaft 82 journaled in the frame 58 and provided with a cam 83 having a plurality of actuating arms 84 which are equispaced circumferentially of the cam, but helically arranged axially thereof, so that they will be successively brought into engagement with adjacent tripping levers 75. A ratchet 85 is also secured to the cam shaft 82 and a pawl 86 engages the ratchet to prevent reverse rotation of the cam.

Numerous mechanisms may be employed for rotating the cam 83 and we have shown in the accompanying drawings several such mechanisms. In Fig. 7, the actuating mechanism comprises a hook-shaped pawl 87 which is normally maintained in contact with the ratchet 85 by a spring 88 and which is pivotally secured to the upper end of an actuating link 89 whose lower end is pivoted to a pedal 92, the link being guided by a bracket 98. The pedal 92 is normally maintained in elevated position by a spring 93.

In operation, when it is desired to move a hosiery drying form from its position within the casing to a position outside thereof for boarding or stripping, the operator depresses the pedal 92, whereupon the pawl 87 rotates the ratchet 85 in the direction of the arrow (Fig. 7), thus engaging one of the actuating arms 84 with a tripping lever 75 and swinging one of the forms about the shaft 74 into a position outside of the casing, as shown in Figs. 5 and 7. When the pedal is released, the pawl 87 merely moves upward, while the pawl 86 maintains the cam in actuating position.

In order to restore each of the forms to its vertical drying position within the casing, an arm 94 extends downwardly from each of the tripping levers 75 and has secured thereto one end of a spring 95 which is attached to the casing and which tends to constantly maintain the arm 94, and thus the forms, in upright position. When the cam 83 is rotated, the last effective actuating arm 84 will pass beyond its cooperating tripping lever 75 and it is at this time that the spring 95 functions to return the form to upright position. It will be understood that in the use of the foregoing mechanism, the adjacent forms will be successively ejected from the casing into position outside thereof for boarding and stripping. As one form is ejected, a previously actuated form is restored to its position in the casing.

In ejecting the forms from the casing and restoring them thereto, it is desirable that the shock of impact be largely absorbed to the end of increasing the longevity of the apparatus. For this purpose, we have provided stop-rods or buffers 96, most clearly shown in Fig. 7, which are provided with a yielding or resilient covering. If it is desired to manually withdraw a form from drying to boarding position, a handle 97, provided on each form, may be used.

Figure 10:
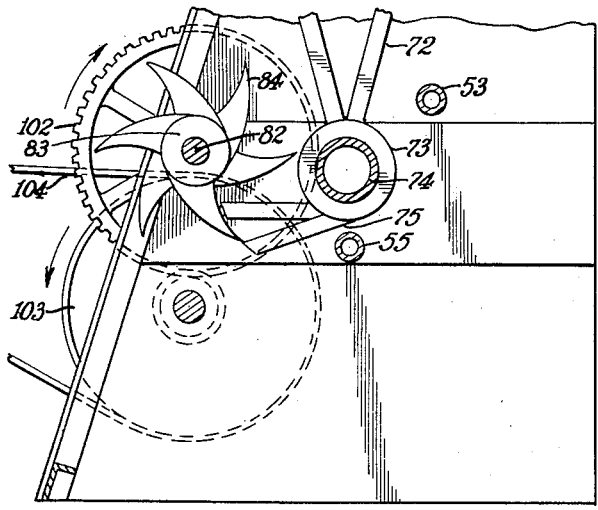
Figure 10 is a fragmentary view in side elevation and section showing a modified form-actuating mechanism.

Figures 10 to 13, inclusive, illustrate modifications of the mechanism for actuating the cam 83 heretofore described. In Fig. 10, the cam shaft 82 is provided with a gear 102 which is driven through a pulley 103 operated by a belt 104 from any convenient source of power. The arrangement and gear ratio will be such as to rotate the cam shaft 82 at a fairly slow rate of speed so as to bring adjacent forms out of the casing at such time intervals as will enable the operator properly to adjust stockings on the forms and/or to strip them therefrom. This mechanism possesses decided advantage after the operators have become accustomed to its operation, and will eliminate the work required to actuate the forms as described in connection with the embodiment of our invention illustrated in Figs. 5 and 7.

Figure 11:
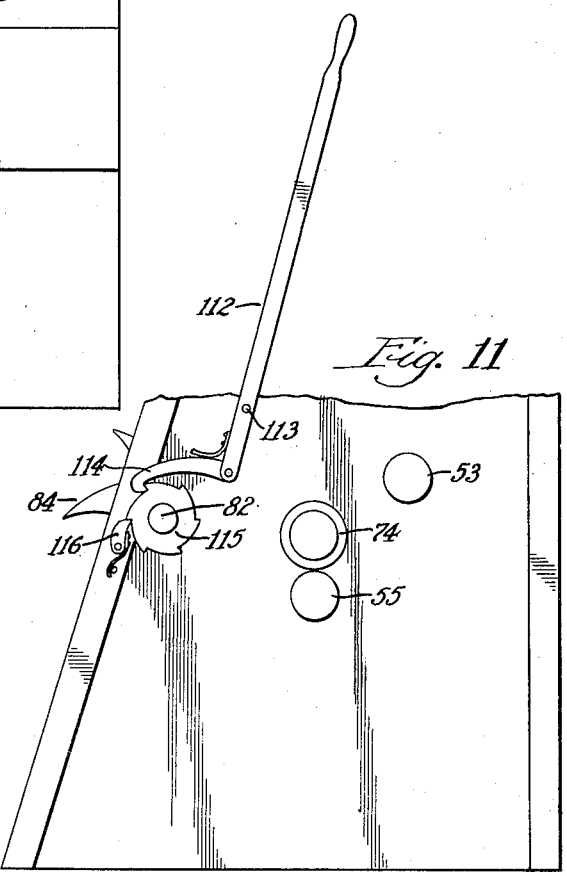
Figure 11 is a view similar to Figure 10 showing another modification of the form-actuating mechanism.

In Fig. 11 we have shown a modification of the form actuating means consisting in the substitution for the pedal 92 of a hand lever 112. This lever may be pivoted on the side of the casing as at 113 and is provided with a pawl 114 adapted to engage a ratchet 115. This arrangement is such that movement of the hand lever 112 to the left, as seen in Fig. 11, will cause rotation of the cam shaft 82 clockwise. A retaining pawl 116 engages the ratchet 115 to prevent reverse rotation of the shaft 82. The hand lever 112 will be positioned so that it may be conveniently grasped by the operator. This arrangement may prove more satisfactory in some instances than the pedal mechanism disclosed in Figs. 5 and 7.

Still another modification of the form actuating mechanism is illustrated in Figs. 12 and 13. A ratchet 122 is secured to the cam shaft 82 and is given a step by step rotation by a pawl 123 pivoted at 124 to one end of an actuating lever 125. A spring 126 serves to maintain the pawl constantly in engagement with the ratchet. The lever 125 rocks on a pivot pin 127 and its free end is provided with a cam follower 128, a spring 129 serving to urge the follower 128 into operative contact with a collar 130 having a cam nose 131 adjacent one end thereof and secured to a constantly rotating shaft 132, but movable longitudinally of the shaft to bring the nose 131 into alignment with the follower 128 by means of a yoke 133 which engages a groove 134 in the collar 130 and is operated by a rod or handle 135. When the operator desires to eject a form from the casing, the collar is moved longitudinally of the shaft by the yoke until the nose 131 is in alignment with the follower 128, which thereupon oscillates the lever 125 and thus causes the pawl 123 to rotate the ratchet 122 one step in a clockwise direction. In this modification also, a pawl 136 serves to prevent reverse rotation of the ratchet 122. Thus, the cam is rotated only in a clockwise direction and the helical arrangement of the actuating points is such as to cause adjacent forms to be successively ejected from the casing.

In each of the modifications shown in Figs. 10 to 13, inclusive, it will be understood that each form is retracted to drying position by means of a spring 95 which is connected to the casing of the machine and to an arm 94 attached to the tripping lever 75.

In Fig. 14, we have illustrated a further embodiment of our invention in which the forms are mounted for horizontal movement from drying to boarding position and vice versa. The numeral 152 indicates the forms, the top portions being broken away for convenience, and one form being shown in boarding and stripping position, with the remainder in drying position. The forms are supported by their respective studs 153 in the housings 154, similarly to the arrangement of Fig. 8, but in the present case, a set screw 155 is provided whereby the forms may be readily interchangeable, no swivel mounting being utilized in this modification, although if such is desired, the scheme of Fig. 8 may be adapted. Each form is provided with the usual flexible inlet and outlet conduits 156 and 157 as previously described, and a finger pull 158 is provided for each form to permit the forms to be operated manually from one position to the other.

Extending rearward from each housing 154 and affixed thereto in any manner is a vertically disposed thin flat bar 162 which is movable longitudinally between the upper and lower sets of circumferentially grooved rollers 163 and 164, rotatable on their respective common horizontal shafts 165 and 166 affixed to the framework. It will be understood that four rollers are provided for each form, the others being omitted for clarity.

The rollers 163 are preferably larger in diameter than the rollers 164 to reduce frictional resistance and the weight of the forms 152, bars 162, and their associated parts is taken wholly on the rollers 163, the rollers 165 acting merely to retain the forms and bars in their vertical positions. It is obvious that there may be substituted for the rollers 163 and 164 an equivalent slideway or guides of any suitable construction. Each bar 162 is provided with a tension spring 167 which is affixed at one end to the bar and at the other to a spring support 168, fastened to the framework.

In order to lessen the shock incident to the return of the forms from boarding to drying position, spring-operated plungers 169, mounted in any suitable manner in the framework, are provided, the hemispherical lower end of each plunger frictionally engaging with its particular bar 162. The upper edge of each bar adjacent the rear end thereof is beveled to facilitate the indicated action and also to obtain a graduated damping action. It is also advisable to provide a resilient bumper member 170 to act as a positive backstop as well as to assist the action of the plungers 169.

Affixed to one side of each bar 162 is a cam plate 172, the greater portion of the top edge of which slopes slightly toward the front, and then somewhat abruptly for a short portion at the front part of its edge, substantially as shown. A bail 175 is pivoted to the framework at 176, only one of the pivots being shown, the other being in alignment therewith on the opposite side of the framework. This bail extends transversely over the bars 162 and is provided with a plurality of depending tongues 177, each of which is disposed in operative alignment with one of the plates 172, the bottoms of each notch between the tongues resting on the bars 162 and the bail maintaining itself in this position by its own weight. Pivoted to both sides of the bail and to the rear thereof is an apron 178 which is also provided with a plurality of tongues 179 in alignment with the tongues 177 and also adapted to coact with the cam plates 172. The bail 175 is also provided with a handle 182 for a purpose presently explained.

The operation of this form of the invention is very similar to the embodiment shown in Fig. 1, the difference primarily consisting in the fact that the forms are moved in a horizontal direction whereas in the prior embodiment they are swung about an axis. Also, the means of locking the forms in stripping and boarding position is substantially the same except that only one stocking is stripped and boarded at a time.

The detailed operation is as follows: Assuming that all of the forms are in drying or rearward position, the operator grasps the finger-pull 158 of the form carrying a finished stocking and draws it toward the front, the form 152 and its bar 162 moving upon the rollers 163 and 164. During this movement, the plate 172 through its front slope actuates the apron tongue 179 to raise it and the associated apron 178 and bail 175 upward, whereupon the tongue 179 slides upon the top of the plate 172, until the form is in its foremost position when the tongue 177 drops behind the rear end of the plate 172 locking it and its associated bar 162 in the forward position, as clearly shown in Fig. 14, the fourth form from the right being extended.

The operator then strips the finished stocking and boards another one, after which the next form, or any other form in the group, is pulled forward. In moving the latter form forward, however, the raising of the bail 175 by the plate 172 of this form raises the tongue 177 locking the previously withdrawn form and thereby releases the plate 172 thereof, so that the latter form is immediately retracted to drying position by the spring 167. The momentum of the return movement of the released form is absorbed by the plunger 169 and its associated spring in an obvious manner.

The functions of the tongues 177 and 179 and the plates 172 are generally analogous to those of the bail blade 38, apron 39 and cams 33 and 34 of the mechanism of Fig. 4, except that the forms of Fig. 14 are operated and released singly, whereas those of Fig. 4 are habitually pulled outwardly in pairs and released singly. If it is desired to release any extended form to its rearward position without withdrawing another form, the handle 182 may be actuated to raise the bail 175 and release that form.

From the foregoing description it will be noted that the forms are so mounted that their adjacent sides face each other in spaced relation, the spaces between adjacent forms being made as small as possible in order to promote heat cooperation between adjacent forms during the drying operation, with a consequent saving of heat and a quickening of the drying operation. This characteristic is an essential feature of our invention. Any heating medium may be employed, as we do not intend to limit ourselves to forms heated by steam or hot water, but may employ electrically heated forms or forms heated by any desired combination of heating agents.

We claim:

1. Hosiery drying apparatus comprising a plurality of internally heated, spaced, drying forms arranged with the sides of each form facing the sides of adjacent forms throughout substantially the length and width of the forms, adjacent forms cooperating to establish a heated condition in the intervening spaces sufficient to set up a natural draft therethrough, and means for supplying heat to all of said forms.

2. Hosiery drying apparatus comprising a plurality of drying forms adapted to occupy drying and boarding positions, means for selectively moving said forms to boarding position, and means interconnecting all forms adapted to automatically release a form in boarding position for return to drying position operably dependent upon the movement of another form to boarding position.

3. Hosiery drying apparatus comprising a plurality of drying forms adapted to occupy drying and boarding positions, means for selectively moving and holding said forms to and in boarding position, and means interconnecting all forms adapted to automatically release a held form for return to drying position operably dependent upon the movement of another form to boarding position.

4. Hosiery drying apparatus comprising a plurality of drying forms adapted to occupy drying and boarding positions, means for biasing said forms toward drying position, means for selectively moving and holding said forms to and in boarding position, and means interconnecting all forms adapted to automatically release a held form for return to drying position operably dependent upon the movement of another form to boarding position.

5. Hosiery drying apparatus comprising a plurality of drying forms adapted to occupy drying and boarding positions, yielding means for normally maintaining said forms in drying position, means for selectively moving and holding said forms to and in boarding position, and means interconnecting all forms adapted to automatically release a held form for return to drying position operably dependent upon the movement of another form to boarding position.

6. Hosiery drying apparatus comprising a plurality of drying forms adapted to occupy drying and boarding positions, means for biasing said forms toward drying position, means for selectively moving and holding said forms to and in boarding position, means interconnecting all forms adapted to automatically release a held form for return to drying position operably dependent upon the movement of another form to boarding position, and means for braking the return of the form to drying position to prevent shock.

7. Hosiery drying apparatus comprising a plurality of drying forms adapted to occupy drying and stripping positions, means for selectively moving and holding a pair of adjacent forms to and in stripping position, and means for releasing one of said forms for return to drying position while maintaining the holding of the other form.

8. Hosiery drying apparatus comprising a plurality of drying forms adapted to occupy drying and stripping positions, means for selectively moving and holding a pair of adjacent forms to and in stripping position, and means interconnecting all forms adapted to automatically release one of said pair of forms for return to drying position operably dependent upon the movement of another form from drying to stripping position, while maintaining the holding of the other form in said pair.

9. Hosiery drying apparatus comprising a plurality of drying forms adapted to occupy drying and stripping positions, means for biasing said forms in drying position, and means for mechanically moving said forms to stripping position in a predetermined sequence, each form being released for return to drying position in advance of the actuation of the next succeeding form to stripping position.

10. Hosiery drying apparatus comprising a plurality of drying forms adapted to occupy drying and stripping positions, means for biasing said forms in drying position, and common means having devices for mechanically moving said forms to stripping position in a predetermined sequence, each form being released for return to drying position in advance of the actuation of the next succeeding form to stripping position.

11. Hosiery drying apparatus comprising a plurality of drying forms adapted to occupy drying and stripping positions, and pivotally mounted on a common support, means for biasing said forms in drying position, and common means having devices for mechanically rocking said forms to stripping position in a predetermined sequence, each form being released for return to drying position in advance of the actuation of the next succeeding form to stripping position.

12. Hosiery drying apparatus comprising a plurality of drying forms adapted to occupy drying and stripping positions, means for biasing said forms in drying position, means for mechanically moving said forms to stripping position in a predetermined sequence, means for holding each form against the tendency to return to drying position, and means for releasing each form for return to drying position in advance of the actuation of the next succeeding form to stripping position.

13. Hosiery drying apparatus comprising a plurality of pivotally mounted drying forms adapted to occupy drying and stripping positions, means for biasing said forms in drying position, a tripping lever for each form, a rotatable hub having devices engageable with said levers in a predetermined sequence to rock said forms to stripping position, means for actuating said hub comprising a pawl and a ratchet associated with the hub, and a second pawl engageable with said ratchet for holding said hub in successive shifted positions.

14. Hosiery drying apparatus comprising a plurality of pivotally mounted, drying forms adapted to occupy drying and stripping positions, means for biasing said forms in drying position, a tripping lever for each form, a rotatable hub having devices engageable with said levers in a predetermined sequence to rock said forms to stripping position, means for actuating said hub comprising a pawl and a ratchet associated with the hub, a constantly rotating shaft, and connections between said shaft and pawl adapted to impart an intermittent movement to said pawl, a second pawl engageable with said ratchet for holding said hub in successive shifted positions, and means for releasing each form for return to drying position in advance of the actuation of the next succeeding form to stripping position.

15. Hosiery drying apparatus comprising a plurality of hosiery drying forms adapted to occupy drying and stripping positions, a shaft, means for pivotally connecting said forms to said shaft, a cam, actuating means for said cam, and cooperating means on said cam and said connecting means for pivoting said forms about said shaft from drying to stripping position.

16. Hosiery drying apparatus comprising a plurality of hosiery drying forms adapted to occupy drying and stripping positions, a shaft, means for pivotally connecting said forms to said shaft, a cam, actuating means for said cam, cooperating means on said cam and said connecting means for pivoting said forms about said shaft from drying to stripping position, and means normally maintaining said forms in drying position.

17. Hosiery drying apparatus comprising a plurality of hosiery drying forms adapted to occupy drying and stripping positions, a shaft, means for pivotally connecting said forms to said shaft, a cam, cooperating means on said cam and said connecting means for pivoting said forms about said shaft to stripping position, means normally maintaining said forms in drying position, and means for actuating said cam to successively move adjacent forms to stripping position.

18. Hosiery drying apparatus comprising a plurality of hosiery drying forms, a shaft, means for pivotally connecting said forms to said shaft, tripping levers on said connecting means, and a cam provided with a plurality of actuating elements adapted to engage said tripping levers to pivot said forms about said shaft.

19. Hosiery drying apparatus comprising a plurality of hosiery drying forms, a shaft, means for pivotally connecting said forms to said shaft, tripping levers on said connecting means, a cam provided with a plurality of actuating elements adapted to engage said tripping levers to pivot said forms about said shaft, and means connected to said forms for restoring them to initial position.

20. Hosiery drying apparatus comprising a plurality of hosiery drying forms, a shaft, means for pivotally connecting said forms to said shaft, tripping levers on said connecting means, and a cam provided with a plurality of actuating elements helically arranged thereon and adapted to engage said tripping levers to successively pivot adjacent forms about said shaft.

21. Hosiery drying apparatus comprising a plurality of hosiery drying forms, a shaft, means for pivotally connecting said forms to said shaft, a cam, cooperating means on said cam and said connecting means for pivoting said forms about said shaft, a ratchet connected to said cam, and means for rotating said ratchet.

22. Hosiery drying apparatus comprising a plurality of hosiery drying forms, a shaft, means for pivotally connecting said forms to said shaft, a cam, cooperating means on said cam and said connecting means for pivoting said forms about said shaft, and power operated means for intermittently rotating said cam.

23. Hosiery drying apparatus comprising a plurality of hosiery drying forms, a shaft, means for pivotally connecting said forms to said shaft, tripping levers on said connecting means, a cam provided with a plurality of actuating elements adapted to engage said tripping levers, a ratchet on said cam, and power operated means for rotating said ratchet to successively pivot adjacent forms about said shaft.

24. Hosiery drying apparatus comprising a plurality of hosiery drying forms, a shaft, means for pivotally connecting said forms to said shaft, tripping levers on said connecting means, a cam provided with a plurality of actuating elements adapted to engage said tripping levers, a ratchet on said cam, means for actuating said ratchet, a power shaft, and arbitrarily actuated means for connecting said ratchet means to said power shaft as desired to successively pivot adjacent forms about said shaft.

25. Hosiery drying apparatus comprising a plurality of hosiery drying forms, supporting members therefor, a shaft, means for connecting said members for rotation upon said shaft, a cam member associated with each of said supporting members, means for moving said forms, supporting members and cam members from drying position to boarding and stripping position, a member common to all said cam members and arranged to coact therewith, means for actuating said member, and means for holding said member and said cam members in said last mentioned position.

26. Hosiery drying apparatus comprising a plurality of hosiery drying forms, supporting members therefor, a shaft, means for connecting said members for rotation upon said shaft, a cam member associated with each of said supporting members, successive cam members having their actuating surfaces at higher and lower elevations, respectively, a member adapted to cooperated with all of said cam members for holding them in boarding and stripping position, means for actuating said member to release a cam member of lower elevation and its associated form, and means for releasing the cam member of higher elevation dependent upon the movement of the another form from drying to boarding and stripping position.

27. Hosiery drying apparatus comprising a plurality of hosiery drying forms, a supporting member for each of said forms, guide rollers for each supporting member; and means for selectively sliding said forms from drying to boarding and stripping position.

28. Hosiery drying apparatus comprising a plurality of hosiery drying forms, supporting members therefor, a shaft, means for connecting said members to said shaft for rotation thereon, means for rotating said members and forms about said shaft from drying position to boarding and stripping position, means common to all said forms for holding said forms in said last mentioned position, and means for releasing said forms from said last mentioned position to drying position.

29. Hosiery drying apparatus comprising a plurality of hosiery drying forms, a supporting member for each of said forms, guide rollers for each supporting member, means for sliding said forms from drying to boarding and stripping position, a cam member for each support member, and means cooperating with said cam members for holding said forms in said last mentioned position and for releasing a held form upon the sliding from drying position of a succeeding form.

30. Hosiery drying apparatus comprising a plurality of hosiery drying forms, supporting members for said forms, guideways for said supporting members, and means for selectively moving said forms upon said guideways.

31. Hosiery drying apparatus comprising a plurality of internally heated, spaced, drying forms, the sides of each form facing the sides of adjacent forms throughout substantially the length and width of the forms and adjacent forms cooperating to establish a heated condition in the intervening spaces, said forms being sufficiently close to substantially inhibit any direct cooling action by the air surrounding the group of forms.

32. Hosiery drying apparatus comprising a drying form, means for biasing said form toward drying position, means for moving said form to stripping position, means for braking the return of said form to drying position to prevent shock, and connections between said moving and braking means adapted to release the braking means substantially simultaneously with the initiation of the movement of the form to stripping position.

33. Hosiery drying apparatus comprising a plurality of drying forms adapted to occupy drying and stripping positions, means for normally maintaining said forms in drying position, and means for selectively moving any desired number of forms to, and for holding them in, stripping position.

34. Hosiery drying apparatus comprising a plurality of drying forms adapted to occupy drying and boarding positions, means for selectively moving said forms to boarding position, and means adapted to automatically release a form in boarding position for return to drying position operably dependent upon the movement of another form to boarding position.

35. Hosiery drying apparatus comprising a plurality of drying forms adapted to occupy drying and boarding positions, means for selectively moving and holding said forms to and in boarding position, and means adapted to automatically release a held form for return to drying position operably dependent upon the movement of another form to boarding position.

36. Hosiery drying apparatus comprising a plurality of drying forms adapted to occupy drying and boarding positions, means for biasing said forms toward drying position, means for selectively moving and holding said forms to and in boarding position, and means adapted to automatically release a held form for return to drying position operably dependent upon the movement of another form to boarding position.

37. Hosiery drying apparatus comprising a plurality of drying forms adapted to occupy drying and boarding positions, yielding means for normally maintaining said forms in drying position, means for selectively moving and holding said forms to and in boarding position, and means adapted to automatically release a held form for return to drying position operably dependent upon the movement of another form to boarding position.

38. Hosiery drying apparatus comprising a plurality of drying forms adapted to occupy drying and boarding positions, means for biasing said forms toward drying position, means for selectively moving and holding said forms to and in boarding position, means adapted to automatically release a held form for return to drying position operably dependent upon the movement of another form to boarding position, and means for braking the return of the form to drying position to prevent shock.

39. Hosiery drying apparatus comprising a plurality of drying forms adapted to occupy drying and stripping positions, means for selectively moving and holding a pair of forms to and in stripping position, and means for releasing one of said forms for return to drying position while maintaining the holding of the other form.

40. Hosiery drying apparatus comprising a plurality of drying forms adapted to occupy drying and stripping positions, means for selectively moving and holding a pair of forms to and in stripping position, means for releasing one of said pair of forms for return to drying position while maintaining the holding of the other form in said pair, and means adapted to automatically release the form of the pair then in stripping position for return to drying position operably dependent upon the movement of the other form of the pair from drying to stripping position.

41. Hosiery drying apparatus comprising a plurality of drying forms arranged side by side when in drying position, means for biasing said forms in drying position, means for moving said forms to stripping position, and means for releasing a form to drying position prior to the next form reaching stripping position.

42. Hosiery drying apparatus comprising a plurality of drying forms adapted to occupy drying and stripping positions, means for biasing said forms in drying position, means for moving said forms to stripping position, means for holding each form while in stripping position against the tendency to return to drying position, and means for releasing a form in stripping position prior to the next selected form reaching stripping position.

43. Hosiery drying apparatus comprising a plurality of internally heated, spaced, drying forms, each form comprising a substantially flattened structure which is thin relative to its width and all forms being arranged with the sides of each form facing the sides of adjacent forms throughout substantially the length and width of the forms, adjacent forms cooperating to establish a heated condition in the intervening spaces sufficient to set up a natural draft therethrough, and means for supplying heat to all of said forms.

44. Hosiery drying apparatus comprising a plurality of aligned, internally heated, spaced, drying forms, each form comprising a substantially flattened structure which is thin relative to its width and all forms being arranged with the sides of each form transversely disposed to the axis of alignment and facing the sides of adjacent forms throughout substantially the length and width of the forms, adjacent forms cooperating to establish a heated condition in the intervening spaces sufficient to set up a natural draft therethrough, and means for supplying heat to all of said forms.

45. Hosiery drying apparatus comprising a plurality of drying forms adapted to occupy drying and boarding positions, means for selectively moving said forms to boarding position, and means for releasing a form in boarding position for return to drying position in advance of another selected form reaching boarding position.

46. Hosiery drying apparatus comprising a plurality of drying forms adapted to occupy drying and boarding positions, a cam member for each form, alternate members having camming surfaces characterized by the same throw and the remaining members having camming surfaces characterized by a different throw, a device engageable with any pair of said cam members having throws different from each other for holding the forms in boarding position, means for actuating said device to release a cam member having one throw while retaining the other cam member and its associated form in boarding position, and means for releasing the retained cam member by engaging said device with any other cam member during the movement of its associated form from drying to boarding position.

47. Hosiery drying apparatus comprising a plurality of drying forms adapted to occupy drying and boarding positions, a cam member for each form, alternate members having camming surfaces characterized by the same throw and the remaining members having camming surfaces characterized by a lesser throw, a device engageable with any pair of said cam members having throws different from each other for holding the forms in boarding position, means for actuating said device to release a cam member having the lesser throw while retaining the other cam member and its associated form in boarding position, and means for releasing the retained cam member by engaging said device with any other cam member during the movement of its associated form from drying to boarding position.

48. Hosiery drying apparatus comprising a plurality of drying forms adapted to occupy drying and boarding positions, a cam member for each form, a device engageable with any cam member for holding the associated form in boarding position, and means for releasing the held cam member by engaging said device with any other cam member during the movement of its associated form from drying to boarding position.

49. Hosiery drying apparatus comprising a plurality of hosiery drying forms, a common shaft for pivotally supporting said forms, means for moving said forms on said shaft from drying to boarding position, means common to all of said forms for holding the same in boarding position, and means for releasing said forms from boarding position for return to drying position.

50. Hosiery drying apparatus comprising a drying form, means for moving said form to stripping position, means for braking the return of said form to drying position to prevent shock, and connections between said moving and braking means adapted to release the braking means substantially simultaneously with the initiation of the movement of the form toward stripping position.

51. Hosiery drying apparatus comprising a plurality of internally heated, spaced, drying forms adapted to occupy drying and boarding positions, said forms being arranged when in drying position with the sides of each form facing the sides of adjacent forms throughout substantially the length and width of the forms, adjacent forms cooperating to establish a heated condition in the intermediate spaces sufficient to set up a natural draft therethrough, means for supplying heat to all of said forms, means for moving said forms to boarding position, and means adapted to automatically release a form in boarding position for return to drying position operably dependent upon the movement of another form to boarding position.

52. Hosiery drying apparatus comprising a plurality of pivotally mounted, hosiery drying forms adapted to occupy drying and stripping positions, each of said forms having a cam-engaging portion, individual cam means for each of said forms, and means for actuating said cam means to engage said portion for pivoting said forms from drying to stripping position and for maintaining said forms in said last-named position.

53. Hosiery drying apparatus comprising a plurality of drying forms adapted to occupy drying and stripping positions, means for moving and holding a pair of forms to and in stripping position, and means for releasing one of said forms for return to drying position while maintaining the holding of the other form.

54. Hosiery drying apparatus comprising a plurality of drying forms adapted to occupy drying and stripping positions, means for moving said forms to stripping position in a sequential order, and means for returning a form to drying position from stripping position in advance of the next succeeding form reaching stripping position while holding the remaining forms of the apparatus in stationary position.

55. Hosiery drying apparatus comprising a plurality of internally heated, spaced, drying forms adapted to occupy drying and boarding positions, said forms being arranged when in drying position with the sides of each form facing the sides of adjacent forms throughout substantially the length and width of the forms, adjacent forms cooperating to establish a heated condition in the intermediate spaces sufficient to set up a natural draft therethrough, means for supplying heat to all of said forms, means for moving said forms to boarding position, and means for releasing a form in boarding position in advance of the arrival of another form in boarding position.

56. Hosiery drying apparatus comprising a shaft, a plurality of hosiery drying forms pivotally mounted on said shaft, each of said forms having a cam-engaging portion, cam means adjacent said shaft, and means for actuating said cam means to engage each of said portions and thereby pivot said forms about said shaft to stripping position.

57. Hosiery drying apparatus comprising a shaft, a plurality of hosiery drying forms pivotally mounted on said shaft, each of said forms having a cam-engaging portion, cam means adjacent said shaft, means for actuating said cam means to engage said portions and thereby pivot each of said forms about said shaft to stripping position, and means normally maintaining said forms in drying position.

58. Hosiery drying apparatus comprising a plurality of pivotally mounted, hosiery drying forms, each of said forms having a cam-engaging portion, a shaft, a plurality of cams helically arranged around said shaft, each cam being adapted to engage with a companion cam portion on the associated form, and means for rotating said shaft to pivot said forms.

59. Hosiery drying apparatus comprising a plurality of pivotally mounted, hosiery drying forms, each of said forms having a cam-engaging portion, a shaft adjacent said forms, a plurality of cams mounted on said shaft and adapted to engage with said portions in a predetermined order to pivot said forms, and power-operated means for intermittently rotating said shaft.

60. Hosiery drying apparatus comprising a plurality of hosiery drying forms adapted to occupy drying and stripping positions, each of said forms having a cam-engaging portion, a shaft adjacent said forms, a plurality of cams helically arranged around said shaft and adapted to engage said portions to pivotally move said forms from drying to stripping position, and power-operated means for intermittently rotating said shaft.

61. Hosiery drying apparatus comprising a plurality of drying forms adapted to occupy drying and stripping positions, means for biasing said forms in drying position, means for moving each of said forms to stripping position, means for releasing a form to drying position prior to another form reaching stripping position, and means for stationarily holding the remaining forms of the apparatus during the release of one form and movement of another.

62. The method of drying hosiery which consists in individually mounting the hosiery articles on a plurality of adjacent drying forms adapted to occupy drying and boarding or stripping positions, moving a pair of forms from drying to stripping position, simultaneously stripping the articles from the moved pair of forms, returning one form of the pair to drying position and boarding an article on the other form of the pair, returning the boarded form to drying position and moving the other form of the pair to boarding position to receive an article, and then returning the last-named form to drying position while moving another pair to stripping position.

63. The method of drying hosiery which consists in individually mounting the hosiery articles on a plurality of adjacent drying forms adapted to occupy drying and boarding or stripping positions, moving a group of forms from drying to stripping position, simultaneously stripping the articles from the moved forms, returning the group less one form to drying position and boarding an article on the last noted form, returning the boarded form to drying position, boarding singly the remainder of the group while in boarding position, returning the last boarded form of the group to drying position, and moving another group to stripping position.

THOMAS W. PROSSER.
JOHN H. WAHLBECK.